(12) United States Patent
Blechert et al.

(10) Patent No.: US 7,612,008 B2
(45) Date of Patent: Nov. 3, 2009

(54) METATHESIS CATALYSTS

(75) Inventors: Siegfried Blechert, Berlin (DE); Stephen Connon, Dublin (IE)

(73) Assignee: LANXESS Deutschland GmbH, Leverkusen (DE)

( * ) Notice: Subject to any disclaimer, the term of this patent is extended or adjusted under 35 U.S.C. 154(b) by 472 days.

(21) Appl. No.: 10/628,707

(22) Filed: Jul. 28, 2003

(65) Prior Publication Data

US 2004/0087438 A1     May 6, 2004

(30) Foreign Application Priority Data

Jul. 31, 2002    (DE)  ................................ 102 34 810

(51) Int. Cl.
*B01J 31/06*      (2006.01)
(52) U.S. Cl. ........................ 502/109; 502/152; 502/167; 502/155; 526/72; 526/281
(58) Field of Classification Search ................ 502/109, 502/152, 155, 167; 526/75, 281
See application file for complete search history.

(56) References Cited

U.S. PATENT DOCUMENTS 4,839,322 A    6/1989   Yodice ........................ 502/159
4,883,851 A   11/1989   Grubbs et al. ................ 526/268
5,854,299 A * 12/1998   Muhlebach et al. ........... 522/66

FOREIGN PATENT DOCUMENTS

| | | |
|---|---|---|
| DE | 32 26 865 | 1/1984 |
| EP | 400 903 | 5/1990 |
| GB | 2 238 791 | 6/1991 |
| WO | 02/14376 | 2/2002 |
| WO | WO 02/14376 * | 2/2002 |

OTHER PUBLICATIONS

DATABASE WPI Section Ch, Week 198708 Derwent Publications Ltd., London, GB: Class A26, AN 1987-054598, XP002265197 & JP 62 011720 A (Mitsui Toatsu Chem Inc) Jan. 20, 1987 Zusammenfassung.

T.M. Tmka, R.H. Grubbs, Acc. Chem. Res. 2001, 34, 18-29, "The Development of $L_2X_2Ru=CHR$ Olefin Metathesis Catalysts: An Organometallic Success Story".

Van Veldhuizen et al., J. Am. Chem. Soc. 2002, 124, 4954-4955, "A Recyclable Chiral Ru Catalysts for Enantioselective Olefin Metathesis. Efficient Catalytic Asymmetric Ring-Opening/Cross Metathesis in Air": Supporting info pp. 1-32.

Gessler et al., Tetrahedron Letters 41 (month unavailable) (2000) 9973-9976; "Synthesis and metathesis reactions of a phosphine-free dihydroimidazole carbene ruthenium complex".

* cited by examiner

*Primary Examiner*—Robert D. Harlan
(74) *Attorney, Agent, or Firm*—Michael A. Miller

(57) ABSTRACT

The invention relates to polymeric transition metal catalysts, to processes for preparing them, to intermediates and also to the use of the transition metal catalysts as catalysts in organic reactions, in particular in olefin metathesis reactions.

11 Claims, No Drawings

METATHESIS CATALYSTS

BACKGROUND OF THE INVENTION

1. Field of the Invention

The invention relates to polymeric transition metal catalysts, to processes for preparing them, to intermediates and also to the use of the transition metal catalysts as catalysts in organic reactions, in particular in olefin metathesis reactions.

2. Brief Description of the Prior Art

Olefin metathesis reactions, for example ring-closing metathesis (RCM), cross-metathesis (CM) and ring-opening metathesis polymerizations (ROMP), are important synthetic methods for forming C—C bonds.

For olefin metathesis reactions, a multiplicity of catalyst systems has been developed, which are described in summary, for example, in T. M. Trnka, R. H. Grubbs, *Acc. Chem. Res.* 2001, 34, 18-29.

With regard to activity, those catalyst systems which comprise alkoxybenzylidene complexes of transition metals in particular have proven useful. However, the removal and, if possible, the reuse of catalysts is becoming more important, since catalyst metal residues in the product may considerably impair its quality.

For example, Veldhuizen et al., *J. Am. Chem. Soc.* 2002, 124, 4954-4955 disclose phosphine-alkoxybenzylidene complexes of ruthenium which are suitable as reusable catalysts for the cross-metathesis of tricyclic norbornenes. However, this restriction to specific substrates is a hindrance to industrial use.

Gessler et al., *Tetrahedron Lett.* 41, 2000, 9973-9976 also describe stable ruthenium complexes which contain dihydroimidazol-2-ylidene and isopropoxybenzylidene ligands. However, the difficult recovery of the catalyst is not satisfactory for industrial applications.

WO 02/14376 A2 describes dendrimeric ruthenium complexes which have dihydroimidazol-2-ylidene and isopropoxybenzylidene ligands and can advantageously be removed from the reaction products in the catalytic reaction mixtures which result from olefin metathesis reactions. However, a disadvantage of these catalysts is the complicated synthesis of the dendritic framework.

There was therefore still a need for easily obtainable catalysts which have high activity even on reuse and can easily be removed from the catalytic reaction mixtures.

SUMMARY OF THE INVENTION

Surprisingly, polymeric compounds have now been found which contain at least structural units of the formula (Ia),

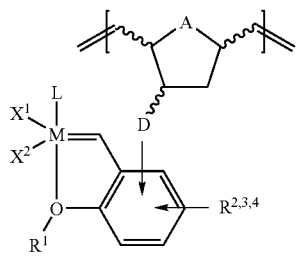

where

M is a transition metal of the 8$^{th}$ transition group of the Periodic Table, $X^1$ and $X^2$ are the same or different and are each chlorine, bromine or iodine, L is an N-heterocyclic carbene ligand of the formula (II)

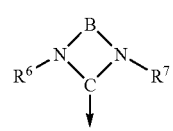

(II)

where the direction of the arrow is intended to represent the bond to M and where B is a 1,2-ethanediyl or 1,2-ethenediyl radical which is optionally mono- or disubstituted by $C_1$-$C_4$-alkyl, $C_6$-$C_{15}$-arylalkyl or $C_5$-$C_{14}$-aryl and $R^6$ and $R^7$ are each independently $C_1$-$C_{20}$-alkyl or $C_5$-$C_{24}$-aryl, $R^1$ is cyclic, straight-chain or branched $C_1$-$C_{20}$-alkyl or $C_5$-$C_{24}$-aryl and $R^2$, $R^3$ and $R^4$ are each independently hydrogen, $C_1$-$C_{20}$-alkyl, $C_5$-$C_{24}$-aryl, halogen, $C_1$-$C_4$-fluoroalkyl, $C_1$-$C_4$-alkoxy, $C_5$-$C_{14}$-aryloxy, ($C_1$-$C_8$-alkyl)OCO—, ($C_1$-$C_8$-alkyl)$CO_2$—, ($C_5$-$C_{14}$-aryl)OCO— or ($C_5$-$C_{14}$-aryl)$CO_2$— and/or in each case two radicals in an ortho-arrangement to one another from the group of $R^2$, $R^3$ and $R^4$ are part of a cyclic system which consists of a carbon framework having 5 to 22 carbon atoms, one or more carbon atoms of the cyclic system optionally being replaced by heteroatoms from the group of sulphur, oxygen or nitrogen, and the cyclic system also being optionally mono- or polysubstituted by radicals selected from the group of halogen, $C_1$-$C_4$-fluoroalkyl, ($C_1$-$C_4$-alkyl)OCO—, ($C_1$-$C_8$-alkyl)$CO_2$—, ($C_6$-$C_{10}$-aryl)OCO— or ($C_5$-$C_{14}$-aryl)$CO_2$— and A is oxygen, sulphur, sulphoxyl, sulphonyl or $CR^8R^9$ where $R^8$ and $R^9$ are each independently hydrogen or $C_1$-$C_4$-alkyl and D is $C_1$-$C_8$-alkylene, [($C_1$-$C_8$-alkylene)-O—]$_n$ where n=1 to 12, ($C_1$-$C_8$-alkylene)$CO_2$—, ($C_1$-$C_8$-alkylene)-OCO—($C_1$-$C_8$-alkylene), ($C_1$-$C_8$-alkylene)$CO_2$—($C_1$-$C_8$-alkylene), ($C_1$-$C_8$-alkylene)$CONR^{10}$—, ($C_1$-$C_8$-alkylene)$NR^{10}CO$—, ($C_1$-$C_8$-alkylene)$CONR^{10}$—($C_1$-$C_8$-alkylene) or ($C_1$-$C_8$-alkylene)$NR^{10}CO$—($C_1$-$C_8$-alkylene) where $R^{10}$ is hydrogen or $C_1$-$C_4$-alkyl and structural units of the formula (Ib)

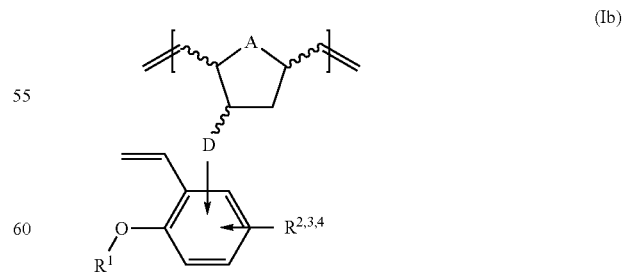

(Ib)

where A, D, $R^1$, $R^2$, $R^3$ and $R^4$ each independently have the same definitions and fulfil the same conditions as specified under the formula (Ia) and optionally structural units of the formula (Ic)

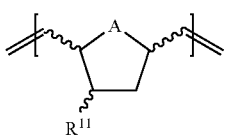

(Ic)

where

A has the same definition and fulfils the same conditions as specified under formula (Ia) and $R^{11}$ is $C_1$-$C_8$-alkyl, [($C_1$-$C_8$-alkylene)-O—]$_n$—($C_1$-$C_8$-alkyl) where n=1 to 12, ($C_1$-$C_8$-alkylene)CO$_2$—($C_1$-$C_8$-alkyl), ($C_1$-$C_8$-alkylene)-OCO—($C_1$-$C_8$-alkyl), ($C_1$-$C_8$-alkylene)-OCO—($C_5$-$C_{14}$-aryl), ($C_1$-$C_8$-alkylene)CO$_2$—($C_5$-$C_{14}$-aryl), ($C_1$-$C_8$-alkylene) CONR$^{10}$—($C_1$-$C_8$-alkyl), ($C_1$-$C_8$-alkylene) NR$^{10}$CO—($C_1$-$C_8$-alkyl), ($C_1$-$C_8$-alkylene)- CONR$^{10}$—($C_5$-$C_{14}$-aryl) or ($C_1$-$C_8$-alkylene) NR$^{10}$CO—($C_5$-$C_{14}$-aryl) where $R^{10}$ is hydrogen or $C_1$-$C_4$-alkyl.

DETAILED DESCRIPTION OF THE INVENTION

Within the scope of the invention, all radical definitions and illustrations listed in general or within areas of preference may be combined with each other, i.e. the particular areas and areas of preference may also be combined as desired.

Wavy lines in formulae are intended to emphasize that in each case both possible isomers are intended to be encompassed by the representation.

For the purposes of the invention, alkyl, alkylene and alkoxy each independently represent a straight-chain, cyclic, branched or unbranched alkyl, alkylene and alkoxy radical respectively, each of which may optionally be further substituted by $C_1$-$C_4$-alkoxy radicals. The same applies to the alkyl moiety of an arylalkyl radical.

In all contexts, $C_1$-$C_4$-alkyl is preferably, for example, methyl, ethyl, n-propyl, isopropyl, n-butyl and tert-butyl, $C_1$-$C_8$-alkyl is additionally neopentyl, n-pentyl, cyclohexyl, n-hexyl, n-heptyl, n-octyl and isooctyl, and $C_1$-$C_{20}$-alkyl is further additionally, for example, n-decyl, n-dodecyl, n-hexadecyl and n-octadecyl.

In all contexts, $C_1$-$C_4$-alkylene is preferably, for example, methylene, 1,1-ethylene, 1,2-ethylene, 1,1-propylene, 1,2-propylene, 1,3-propylene, 1,1-butylene, 1,2-butylene, 2,3-butylene and 1,4-butylene, and $C_1$-$C_8$-alkylene is additionally 1,5-pentylene, 1,6-hexylene, 1,1-cyclohexylene, 1,4-cyclohexylene, 1,2-cyclohexylene and 1,8-octylene.

For the purposes of the invention, aryl is a carbocyclic radical or heteroaromatic radical in which no, one, two or three framework atoms per cycle, although at least one framework atom in the entire radical, is a heteroatom which is selected from the group of nitrogen, sulphur and oxygen. The carbocyclic aromatic radicals or heteroaromatic radicals may also be substituted by up to five identical or different substituents per cycle, selected, for example, from the group of hydroxyl, chlorine, fluorine, nitro and $C_1$-$C_{12}$-alkyl. For the purposes of the invention, aryl is preferably an above-defined carbocyclic radical.

The same applies to the aryl moiety of an arylalkyl radical. $C_6$-$C_{15}$-arylalkyl is, for example, and with preference, benzyl.

For the purposes of the invention, fluoroalkyl is in each case independently a straight-chain, cyclic, branched or unbranched alkyl radical which may be singly, multiply or fully substituted by fluorine atoms.

For example and with preference, $C_1$-$C_4$-fluoroalkyl is in all contexts preferably trifluoromethyl, 2,2,2-trifluoroethyl, pentafluoroethyl and nonafluorobutyl.

The polymeric compounds containing at least the structural units of the formula (Ia) and (Ib) and optionally (Ic) may also contain structural units which are derived from olefins which are suitable for ring-opening metathesis polymerization. These are sufficiently well known from the literature (e.g. from T. M. Trnka, R. H. Grubbs, *Acc. Chem. Res.* 2001, 34, 18-29 and the literature cited there).

Polymeric compounds containing structural units of the formulae (Ia) and (Ib) and optionally structural units of the formulae (Ic) are preferably those which have a degree of polymerization (numerical average) of 6 to 2000, particularly preferably 10 to 500.

It is pointed out that the scope of the invention also encompasses polymeric compounds in which the structural units of the formulae (Ia) and/or of the formulae (Ib) and/or optionally the structural units of the formulae (Ic) may in each case have different definitions for A and D or M, L, $X^1$, $X^2$ or $R^1$, $R^2$, $R^3$, $R^4$ or $R^{11}$, although preference is given to those polymeric compounds in which M, L, $X^1$ and $X^2$ in the structural units of the formula (Ia), and likewise $R^1$, $R^2$, $R^3$ and $R^4$ in the structural units of the formula (Ia) and (Ib), and $R^{11}$ in any structural units of the formula (Ic) present and likewise A and D in the structural units of the formula (Ia) and (Ib) and any structural units of the formula (Ic) present are in each case identical.

Preference is further given to those polymeric compounds in which the proportion of the structural units of the formula (Ia) and of the formula (Ib) and any structural units of the formula (Ic) present (average proportion by weight) is 80% or more, preferably 90% or more and particularly preferably 98% or more.

The ratio of structural units of the formula (Ia) to structural units of the formula (Ib) in the polymer is preferably 1:2 to 1:500, particularly preferably 1:8 to 1:200.

When the polymeric compound also contains structural units of the formula (Ic), the ratio of structural units of the formula (Ia) to structural units of the formula (Ic) is in addition preferably 10:1 to 1:200, particularly preferably 1:1 to 1:100 and very particularly preferably 1:10 to 1:50.

D in the structural units (Ia) and (Ib) is preferably bonded via the ortho-position to the olefin or to the ylidene unit.

M in formula (Ia) is preferably ruthenium or osmium, particularly preferably ruthenium.

$X^1$ and $X^2$ are preferably identical and are each chlorine or bromine, particularly preferably chlorine.

L in formula (Ia) is an N-heterocyclic carbene ligand of the formula (II).

B in formula (II) is preferably 1,2-ethanediyl or 1,2-ethenediyl.

$R^6$ and $R^7$ in formula (II) are preferably and in each case independently, although preferably identically, a primary $C_5$-$C_{20}$-alkyl radical, with the proviso that the carbon atom bonded to the nitrogen atom bears a tertiary alkyl radical, or are each a secondary $C_3$-$C_{20}$-alkyl radical, a tertiary $C_4$-$C_{20}$-alkyl radical or a phenyl radical which is further mono- or polysubstituted, although at least in an ortho-position, by $C_1$-$C_4$-alkyl radicals.

$R^6$ and $R^7$ in the formula (III) are particularly preferably identical and are each isopropyl, sec-butyl, tert-butyl, 1-methylbutyl, 1-ethylpropyl, 1,1-dimethylpropyl, 1,2-dimethylpropyl, 1-methylpentyl, 1,1-dimethylbutyl, 1,2-dimethylbutyl, 1,3-dimethylbutyl, 1-ethylbutyl, 1,1,2-trimethylpropyl, 1,2,2-trimethylpropyl, 1-ethyl-1-methylpropyl, cyclopentyl, cyclohexyl, cycloheptyl, neopentyl, adamantyl, norbornyl, o-tolyl, 2,6-dimethylphenyl, 2-ethyl-6-methylphenyl, 2,6-diisopropylphenyl, o-anisyl, 2,6-dimethoxyphenyl, mesityl and isityl.

$R^1$ is preferably a radical which is selected from the group of ethyl, isopropyl, tert-butyl, neopentyl, cyclohexyl and cyclopentyl, and even greater preference is given to isopropyl.

$R^2$, $R^3$ and $R^4$ are preferably each independently hydrogen, $C_1$-$C_4$-alkyl, fluorine, chlorine or $C_1$-$C_4$-fluoroalkyl, and are particularly preferably identical and are each hydrogen.

A is preferably oxygen or $CH_2$, and even greater preference is given to oxygen.

D is preferably $[(C_1$-$C_4$-alkylene)-O—$]_n$ where n=1 or 2, or $(C_1$-$C_4$-alkylene)-$CO_2$—, particularly preferably $(C_1$-$C_4$-alkylene)-O— and very particularly preferably $CH_2O$.

$R^{11}$ is preferably $(C_1$-$C_4$-alkylene)-O—$]_n$—$(C_1$-$C_4$-alkyl) where n=1 or 2, $(C_1$-$C_4$-alkylene)$CO_2$—$(C1$-$C_4$-alkyl) or $(C_1$-$C_4$-alkylene)$CO_2$—$(C_5$-$C_{14}$-aryl), particularly preferably $CH_2O_2C$—$(C_1$-$C_4$-alkyl) or $CH_2OCO$—$(C_5$-$C_{14}$-aryl), and very particularly preferably $CH_2OC$Ophenyl or $CH_2OCO$(o-methylaminophenyl), which may be used as a fluorescence marker.

Very particularly preferably, the polymeric compounds according to the invention contain structural units of the formula (Ia):

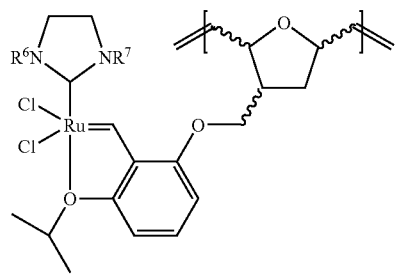
(Ia1)

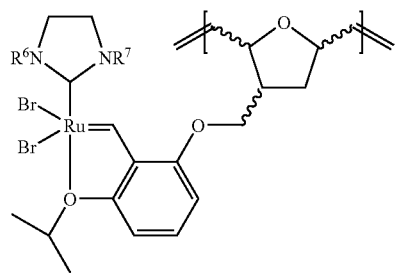
(Ia2)

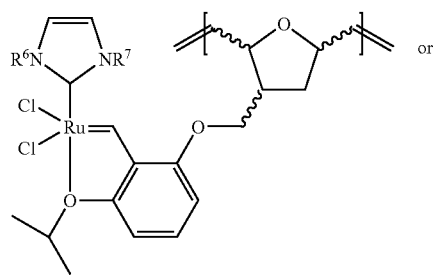
(Ia3) or

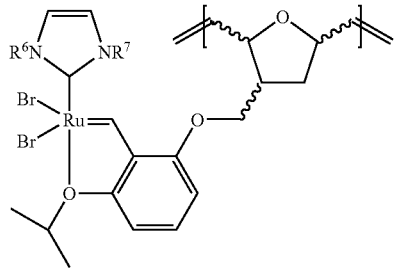
(Ia4) -continued where $R^6$ and $R^7$ are identical and are each isopropyl, sec-butyl, tert-butyl, 1-methylbutyl, 1-ethylpropyl, 1,1-dimethylpropyl, 1,2-dimethylpropyl, 1-methylpentyl, 1,1-dimethylbutyl, 1,2-dimethylbutyl, 1,3-dimethylbutyl, 1-ethylbutyl, 1,1,2-trimethylpropyl, 1,2,2-trimethylpropyl, 1-ethyl-1-methylpropyl, cyclopentyl-, cyclohexyl-, cycloheptyl-, neopentyl, adamantyl, norbornyl, o-tolyl, 2,6-dimethylphenyl, 2-ethyl-6-methylphenyl, 2,6-diisopropylphenyl, 2,6-dimethoxyphenyl and mesityl.

Very particularly preferably, the polymeric compounds according to the invention contain as structural units of the formula (Ib):

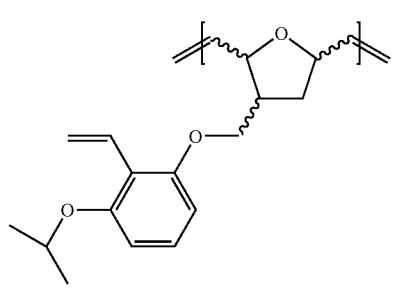
(Ib1)

When the polymeric compounds according to the invention contain structural units of the formula (Ic), very particular preference is given to the following:

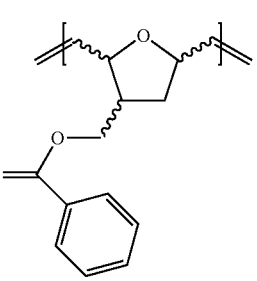
(Ic1)

The polymeric compounds according to the invention containing structural units of the formulae (Ia) and (Ib) and optionally (Ic) are accessible by a process which is likewise encompassed by the invention.

This is a process for preparing polymeric catalysts, which is characterized in that compounds of the formula (IIIa) and/or (IIIb)

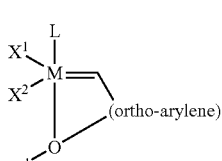
(IIIa)

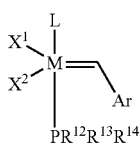
(IIIb)

where $R^1$, L, $X^1$ and $X^2$ each have the definition and areas of preference specified under formula (Ia) and ortho-arylene is an ortho-phenylene or ortho-naphthylene radical, for example 1,2-naphthylene, and the radicals mentioned may also be substituted by one, two, three or four radicals per cycle which are selected from the group of $C_1$-$C_4$-alkyl, $C_5$-$C_{14}$-aryl and $C_1$-$C_4$-alkoxy and Ar is $C_5$-$C_{14}$-aryl and $R^{12}$, $R^{13}$ and $R^{14}$ are each independently $C_1$-$C_8$-alkyl or $C_5$-$C_{14}$-aryl are reacted with at least one compound of the formula (IV)

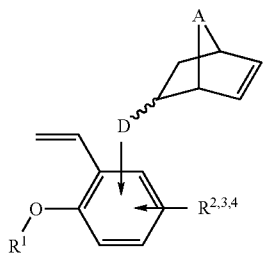
(IV)

where $R^1$, $R^2$, $R^3$, $R^4$, A and D have the definition and areas of preference specified under formula (Ia).

and optionally with at least one compound of the formula (V)

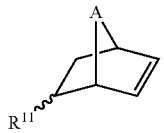
(V)

where $R^{11}$ and A each have the definition and areas of preference specified under formula (Ic)

and optionally with one or more further olefins which can be polymerized by ring-opening metathesis.

The compounds of the formula (IV) are hitherto unknown and therefore likewise encompassed by the invention.

In formula (IIIa), ortho-arylene is preferably ortho-phenylene.

In formula (IIIb), aryl is preferably phenyl.

Also, $R^{12}$, $R^{13}$ and $R^{14}$ in formula (IIIb) are preferably identical and each $C_1$-$C_8$-alkyl or $C_5$-$C_{14}$-aryl, particularly preferably identical and each cyclohexyl.

A particularly preferred compound of the formula (IV) is (7-oxa-2-norborn-2-en-5-yl-methyl)(2-isopropoxy-3-ethenylphenyl)ether (IVa).

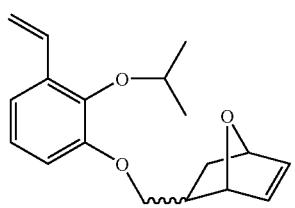
(IVa)

The compounds of the formula (IIIa) and (IIIb) are known from the literature or can be prepared in a similar manner to methods known from the literature (see in particular Veldhuizen et al., *J. Am. Chem. Soc.* 2002, 124, 4954-4955).

The compounds of the formulae (IV) and (V) may be prepared in a similar manner to the literature methods. As an example, the synthetic sequence for the compound of the formula (IVa) is given.

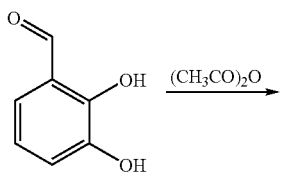 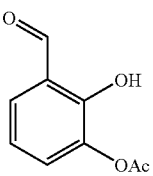 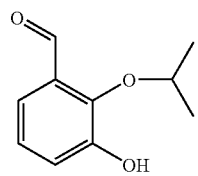

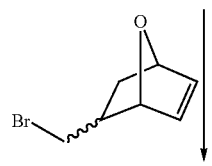

Wittig Olefination

Preference is given to carrying out the process according to the invention in an organic solvent. Examples of useful organic solvents include amides, for example dimethylformamide, N-methylpyrrolidinone, halogenated aliphatic or optionally halogenated, aromatic solvents having up to 16 carbon atoms, e.g. toluene, o-, m-, p-xylene, chloroform, dichloromethane, chlorobenzene, the isomeric dichlorobenzenes, fluorobenzene, nitriles, e.g. acetonitrile and benzonitrile, sulphoxides such as dimethyl sulphoxide or mixtures thereof.

Preferred organic solvents are toluene and dichloromethane.

The reaction temperature may be, for example −30° C. to 100° C., preferably 10 to 40° C.

The reaction time may be, for example, 2 minutes to 24 hours, preferably 5 min to 1 h.

When using compounds of the formula (IIIb), it is advantageous also to use compounds which are capable of scavenging phosphines. These are preferably copper salts, in particular $CuCl_2$ and CuCl which are also preferably used in an equimolar amount or in a molar excess.

Depending on the choice of the molar ratios of the monomeric compounds (IIIa) and/or (IIIb), (IV) and any (V), a corresponding average molar composition is achieved in the polymeric compounds according to the invention. The areas of preference specified above for the ratios of the structural units of the formulae (Ia), (Ib) and any (Ic) consequently apply correspondingly to the preferred ranges of the ratios of monomeric compounds to be used.

The workup can be effected in such a way, for example, that any insoluble constituents present are filtered out and the filtrate is concentrated, the residue is subsequently washed with organic solvent and then optionally dried under reduced pressure.

In this way, the polymeric compounds according to the invention comprising the structural units of the formulae (Ia) and (Ib) and any (Ic) can be obtained in high yields. These polymeric compounds according to the invention are suitable, for example, as metathesis catalysts, in particular for ring-closing metatheses, ring-opening metatheses, cross-metatheses and ring-opening metathesis polymerizations.

The invention therefore also encompasses a process for preparing olefins by catalytic olefin metathesis, which is characterized in that the catalysts used are the polymeric compounds according to the invention containing the structural units of the formulae (Ia) and (Ib) and optionally (Ic).

An example of a possible procedure is to react the reactant olefin, optionally in an organic solvent, with the polymeric compounds according to the invention and in this way to obtain catalytic reaction mixtures which contain the product.

The reaction temperature may be, for example, −30 to 100° C.

In a preferred embodiment, the polymeric compounds according to the invention are removed from the catalytic reaction mixtures and reused for the preparation of olefins by catalytic olefin metathesis. The procedures of removal and reuse can be repeated once or more than once.

In a further preferred embodiment of the process according to the invention, the removal can be effected in such a way that sufficient aliphatic hydrocarbons, preferably having 5 to 12 carbon atoms, and/or diethyl ether are added to the catalytic reaction mixtures to at least partially precipitate out the polymeric compounds. Subsequently, the polymeric compounds according to the invention can be removed by filtration and/or decanting from the product solution.

Aliphatic hydrocarbons having 5 to 12 carbon atoms are, for example and with preference, n-pentane and n-hexane.

The polymeric compounds according to the invention are suitable in particular as catalysts, preferably as catalysts in metathesis reactions, for example cross-metatheses, ring-closing metatheses and ring-opening metathesis polymerizations, optionally with subsequent cross-metathesis.

They are notable for their high activities for a multiplicity of different substrates, for example ring-closing metatheses at low catalyst loading result in quantitative conversions even in a short time and at low temperatures.

The polymeric compounds according to the invention can also be removed easily and in high yields from the catalytic reaction mixtures and only have a small loss of activity on reuse.

EXAMPLES

Example 1

Preparation of methyl 7-oxanorborn-2-en-5-ylcarbonate

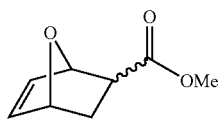

Furan and methyl acrylate were distilled before use.

A mixture of furan (22.6 ml, 311 mmol) and methyl acrylate (20.0 ml, 222 mmol) was cooled to −20° C. under nitrogen. $AlCl_3$ (8.880 g, 67 mmol) was added to this mixture in four portions, likewise under nitrogen. The reaction mixture was stirred for 30 min and subsequently allowed to heat to room temperature within 2 h. The crude reaction mixture was admixed with ethyl acetate (30 ml) and filtered. The filtrate was washed with saturated $NH_4Cl$ solution (50 ml) and dried over magnesium sulphate and concentrated under reduced pressure.

The crude product was purified by flash chromatography (using 50:50 cyclohexane:ethyl acetate as the eluent) to obtain the pure product 16.2 g (55% of theory) as a 55:45 mixture of the exo- and endo-isomers.

$δ_H$ (200 MHz, $CDCl_3$, E1=exo-isomer, E2=endo-isomer): 6.40-6.46 (1H, m, H-5 E2), 6.32-6.40 (2H, m, H-5,6 E1), 6.22 (1H, dd, J 2, 15 Hz, H-6 E2), 5.12-5.20 (2H, m, H-1,4 E2), 4.98-5.08 (2H, m, H-1,4 E1), 3.72 (3H, s, CH₃ E1), 3.62 (3H, s, CH₃ E2), 3.10 (1H, quint., J 6 Hz, H-3 E1), 2.42 (1H, dd, J 3, 8 Hz, H-3 E1), 2.04-2.22 (1H, m, H-2 E1), 1.48-1.70 (2H, m, H-3 E2), 1.20-1.30 (1H, t, 6 Hz, H-2 E2).

Example 2

Preparation of 7-oxanorborn-2-en-5-ylmethanol

A solution of methyl 7-oxanorborn-2-en-5-ylcarbonate (16.163 g, 105 mmol, see Example 1) in THF (75 ml) was added dropwise with stirring and under nitrogen to a suspension of lithium aluminium hydride (4.376 g, 115 mmol) in anhydrous THF (100 ml), in such a way that the solution boiled gently. The reaction mixture was subsequently stirred at room temperature for another 12 h and then quenched by cautiously adding an ice-water mixture. The organic phase was removed and the aqueous phase extracted with ethyl acetate (3×200 ml). The combined organic phases were washed with water (600 ml) and saturated sodium chloride solution (600 ml), dried over sodium sulphate and concentrated under reduced pressure.

The crude product was purified by flash chromatography (using a 50:50 mixture of cyclohexane and ethyl acetate). 3.7 g (32% of theory) of the pure product were obtained.

$\delta_H$ (500 MHz, CDCl₃, E1=exo-isomer, E2=endo-isomer): 6.38 (1H, dd, J 1.5, 5.9 Hz, H-5 E2), 6.32 (2H, br s, H-5,6 E1), 6.28 (1H, dd, J 1.0, 5.9 Hz, H-6 E2), 5.01 (1H, d, J 3.7 Hz, H-1 E2), 4.93 (2H, m, H-1,4 E1), 4.87 (1H, s, H-4 E2), 3.75 (1H, dd, J 5.1, 10.4 Hz, HCHOH E2), 3.52-3.59 (2H, m, CH₂OH E1), 3.19 (1H, t, J 10.1 Hz, HCHOH E2), 2.44 (1H, m, H-2 E2), 1.97-2.00 (1H, m, H-3 E2), 1.76-1.8 (1H, m, H-2 E1), 1.34-1.39 (2H, m, H-3 E1), 0.70 (1H, dd, J 4.1, 11.3 Hz, H-3 E2).

Example 3

Preparation of 7-oxanorborn-2-en-5-yl-methyl bromide

Tetrabromomethane (1.161 g, 3.50 mmol) was added to a solution of 7-oxanorborn-2-en-5-ylmethanol (0.305 g, 2.50 mmol, from Example 2) in CH₂Cl₂ (12.5 ml). The solution was cooled to 0° C. and admixed with triphenylphosphine (1.836 g, 7 mmol). The reaction mixture was allowed to warm to room temperature and stirred for 12 h. The solvent was removed under reduced pressure and the remaining solid was taken up in cyclohexane. The crude product was purified by flash chromatography (using a 98:2 mixture of cyclohexane and ethyl acetate). 0.3 g (59% of theory) of the pure product were obtained. The product was stored under cool conditions with the exclusion of light.

$\delta_H$ (200 MHz, CDCl₃, E1=exo-isomer, E2=endo-isomer): 6.46 (1H, dd, J 2, 6 Hz, H-5 E2), 6.35 (2H, br s, H-5,6 E1), 6.36 (1H, dd, J 2, 8 Hz, H-6 E2), 4.96-5.08 (2H, m, H-1,4 E2), 4.99 (1H, d, J 4 Hz, H-1 E1), 4.86 (1H, s, H-4 E1), 3.42-3.49 (2H, m, CH₂Br E1), 3.36 (1H, dd, J 7, 10 Hz, HCHBr E2), 3.19 (1H, t, J 10 Hz, HCHBr E2), 2.58-2.68 (1H, m, H-2 E2), 2.06-2.12 (1H, m, H-3 E2), 2.00-2.06 (1H, m, H-2 E1), 1.37-1.43 (1H, m, H-3 E1), 1.36 (1H, dt, J 4, 12 Hz, H-3 E1), 0.80 (1H, dd, J 4, 12 Hz, H-3 E2).

Example 4

Preparation of 2-hydroxy-3-acetoxybenzaldehyde

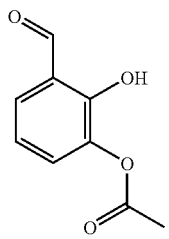

A solution of 2,3-dihydroxybenzaldehyde (4.000 g, 28.96 mmol) and acetic anhydride (3.260 g, 32.00 mmol) in acetic acid (40 ml) was heated to reflux under a nitrogen atmosphere for 72 h.

After cooling, the reaction mixture was poured into ice-water, and a white solid precipitated out.

After extraction with CH₂Cl₂ (2×100 ml), the combined organic phases were rapidly washed with ice-cold water (2×100 ml) and saturated sodium chloride solution (100 ml). After drying over magnesium sulphate and concentrating to a volume of approx. 70 ml, hexane (50 ml) was added and the mixture was concentrated again under reduced pressure until the commencement of crystallization. The mixture was aerated and cooled to 0° C. After one hour at 0° C., the precipitated solid was filtered off with suction and dried under high vacuum.

3.95 g (76% of theory) of 2-hydroxy-3-acetoxybenzaldehyde were obtained as a colourless crystalline solid.

$\delta_H$ (500 MHz, CDCl₃): 11.12 (1H, s, CHO), 9.92 (1H, s, OH), 7.49 (1H, dd, J 1.5, 7.7 Hz), 7.32 (1H, dd, J 0.7, 7.9 Hz), 7.03 (1H, dd, J 7.7, 7.9 Hz), 2.86 (3H, s, OCOMe).

Example 5

Preparation of 2-isopropoxy-3-hydroxybenzaldehyde

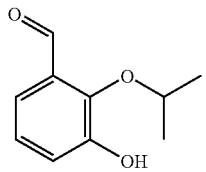

A 100 ml round-bottomed flask was charged with dried molecular sieve 4 A mol (approx. 1 g) and dried (130° C., 12 h) K₂CO₃ (5.520 g, 40.00 mmol) and charged under a nitrogen atmosphere with a solution of 2-hydroxy-3-acetoxybenzaldehyde (3.600 g, 19.98 mmol, from Example 3) in dried DMF (50 ml). After stirring for 30 minutes, 2-bromopropane (13.00 ml, 138.88 mmol) was added via a cannula and the resulting yellow solution was heated to 50° C. for 12 h. After cooling to room temperature, water (100 ml) was added. The biphasic mixture was extracted with diethyl ether (3×200 ml). The combined organic phases were washed with water (5×100 ml), dried over magnesium sulphate and concentrated under reduced pressure.

¹H NMR analysis showed a 92:8 mixture of mono- and bis-alkylated products. To hydrolyse the 3-acetoxy group, the residue was taken up in methanol (20 ml) and admixed with a 30% solution of sodium methoxide in methanol until the resulting yellow solution gained no more colour intensity on further addition.

The methanolic solution was concentrated under reduced pressure to dryness and the remaining residue was taken up in water (40 ml). The yellow solution of the phenoxide was extracted with MTBE (2×20 ml), in order to remove the undesired bis-alkylated by-product. Subsequently, acetic acid was added to the aqueous phase until decolorization.

Subsequently, extraction was effected using MTBE (5×50 ml), and the combined organic phases were dried over magnesium sulphate and concentrated under reduced pressure. The yellow residue was purified by column chromatography (eluent $CH_2Cl_2$). 2.66 g (74% of theory) of the product were obtained as a colourless solid.

$\delta_H$ (500 MHz, $CDCl_3$): 10.25 (1H, s, CHO), 7.37 (1H, dd, J 1.4, 7.7 Hz), 7.20 (1H, dd, J 1.4, 7.9 Hz), 7.11 (1H, dd, 7.7, 7.9 Hz), 5.96 (1H, s, OH), 4.33 (1H, septet, J 6.1 Hz C$\underline{H}(CH_3)_2$), 1.38 (6H, d, J 6.1 Hz, $CH(C\underline{H}_3)_2$).

Example 6

Preparation of 7-oxa-2-norborn-2-en-5-ylmethyl 2-isopropoxy-3-formylphenyl ether

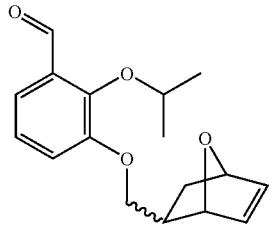

7-Oxanorborn-2-en-5-ylmethyl bromide (1.0 g, 5.3 mmol from Example 3) and potassium carbonate (0.498 g, 3.6 mmol) were added to a solution of 2-isopropoxy3-hydroxybenzaldehyde (0.317 g, 1.8 mmol from Example 5) in dry DMF (6 ml) and the reaction mixture was stirred at 50 to 60° C. for 12 h. After cooling to room temperature, water (10 ml) was added. The resulting biphasic mixture was extracted with MTBE (3×20 ml). The combined organic phases were washed with water (5×30 ml) and sodium hydrogencarbonate solution (30 ml), dried over magnesium sulphate and concentrated under reduced pressure. The crude product was purified by flash chromatography (eluent $CH_2Cl_2$). 0.4 g (76% of theory) of the pure product was obtained.

$\delta_H$ (500 MHz, $CDCl_3$, E1=exo-isomer, E2=endo-isomer): 10.45 (1H, s, CHO), 7.42 (1H, dd, J. 1.9, 7.5 Hz, ArH), 7.02-7.14 (2H, m, ArH), 6.45 (1H, dd, J 1.6, 5.9 Hz, H-6 E2), 6.38 (2H, ddd, J 1.5, 5.9, 13.1 Hz, H-5,6 E1), 6.31 (1H, dd, J 1.3, 5.8 Hz, H-5 E2), 5.13 (2H, d, J 4.2 Hz, H-1 E2), 5.01 (2H, d, J 3.3 Hz, H-4 E2), 4.96-5.01 (2H, m, H-4,1 E1), 4.62-4.68 (1H, m, C$\underline{H}(CH_3)_2$), 4.00-4.04 (2H, m, C$\underline{H}_2$O E1), 3.93 (1H, dd, J 6.4, 9.1 Hz, $\underline{H}$CHO E2), 3.54 (1H, t, J 9.1 Hz, HC$\underline{H}$O E2), 2.76-2.81 (1H, m, H-2 E2), 2.10-2.15 (2H, m, H-3 E1 & E2), 1.51-1.54 (1H, m, H-3 E1), 1.56 (1H, dd, J 8, 12 Hz, H-2 E1), 1.36 (6H, d, J 6.1 Hz, $CH(C\underline{H}_3)_2$), 0.86 (1H, dd, J 4.1, 11.4 Hz, H-3 E2).

Example 7

Preparation of 7-oxa-2-norborn-2-en-5-ylmethyl 2-isopropoxy-3-ethenylphenyl ether

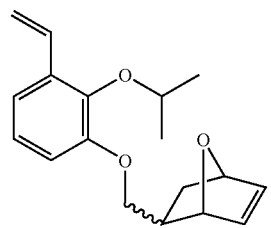

Potassium tert-butoxide (0.218 g, 1.94 mmol) was added at 0° C. in one portion to a suspension of methyltriphenylphosphonium bromide (0.694 g, 1.94 mmol) in dry diethyl ether (5 ml) and the reaction mixture was stirred for 10 min. Subsequently, a solution of 7-oxa-2-norborn-2-en-5-ylmethyl 2-isopropoxy-3-formylphenyl ether (0.280 g, 0.97 mmol from Example 6) in diethyl ether (3.6 ml) was added and the mixture was stirred at 0° C. for a further 20 min. Afterwards, the mixture was quenched by adding saturated ammonium chloride solution. The aqueous phase was extracted using diethyl ether (3×10 ml) and, after washing with water (30 ml) and saturated sodium chloride solution (30 ml), the combined organic phases were dried over magnesium sulphate and concentrated under reduced pressure.

The crude product was purified by flash chromatography (eluent $CH_2Cl_2$). 0.22 g (79% of theory) of the pure product was obtained.

$\delta_H$ (500 MHz, $CDCl_3$, E1=exo-isomer, E2=endo-isomer): 7.09-7.15 (2H, m, ArH), 6.95-6.97 (1H, m, ArH), 6.73 (1H, d, J 8.0 Hz, ArCH), 6.43 (1H, dd, J 1.3, 5.8 Hz, H-6 E2), 6.36 (2H, s, H-5,6 E1), 6.27 (1H, dd, J 0.8, 5.8 Hz, H-5 E2), 5.71 (1H, d, J 17.8 Hz, $\underline{H}$CH=CH), 5.26 (1H, dd, J 0.9, 11.1 Hz, HC$\underline{H}$=CH), 5.15 (1H, d, J 3.7 Hz, H-1 E2), 4.97-4.99 (3H, m, H-4 E2 & H-4,1 E1), 4.45 (1H, septet, J 6.1 Hz, C$\underline{H}(CH_3)_2$), 3.94-4.02 (2H, m, C$\underline{H}_2$O E1), 3.91 (1H, dd, J 6.1, 9.1 Hz, $\underline{H}$CHO E2), 3.49 (1H, t, J 9.1 Hz, HC$\underline{H}$O E2), 2.75-2.81 (1H, m, H-2 E2), 2.08-2.13 (2H, m, H-3 E1 & E2), 1.50 (1H, dd, J 8.1, 11.5 Hz, H-3 E1), 1.56 (1H, dt, J 11.5, 3.9 Hz, H-2 E1), 1.32 (6H, d, J 6.1 Hz, $CH(C\underline{H}_3)_2$), 0.84 (1H, dd, J 4.1, 11.4 Hz, H-3 E2).

Example 8

Preparation of 7-oxa-2-norborn-2-en-5-yl-methyl benzoate

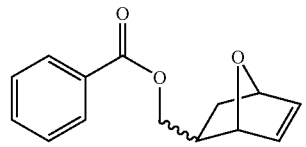

A solution of benzoyl chloride (0.93 ml, 8 mmol) in $CH_2Cl_2$ (8 ml) was added dropwise at 0° C. to a mixture of 7-oxanorborn-2-en-5-ylmethanol (0.505 g, 4.0 mmol from Example 2), 4-dimethylaminopyridine (0.049 g, 0.4 mmol) and triethylamine (2.2 ml, 16 mmol) in $CH_2Cl_2$ (8 ml). The reaction mixture was stirred at room temperature and the progress of the reaction was followed by thin-layer chromatography (eluent 80:20 ethyl acetate: cyclohexane). After 2.5 h, the reaction mixture was quenched by adding water (20 ml). The product was extracted using $CH_2Cl_2$ (3×20 ml). The combined organic phases were washed with dilute hydrochloric acid, 10% $NaHCO_3$-solution (60 ml), water (60 ml) and concentrated sodium chloride solution (60 ml), dried over magnesium sulphate and concentrated under reduced pressure.

The crude product was purified by flash chromatography (eluent 70:30 to 90:10 $CH_2Cl2$:cyclohexane). 0.68 g (74% of theory) of the pure product was obtained.

$\delta_H$ (500 MHz, $CDCl_3$, E1=exo-isomer, E2=endo-isomer): 8.03-8.07 (2H, m, ArH), 7.55-7.57 (1H, m, ArH), 7.43-7.47 (2H, m, ArH), 6.41 (1H, dd, J 1.4, 5.8 Hz, H-5 E2), 6.33-6.36 (3H, m, H-5,6 E1 & H-6 E2), 5.06 (2H, d, J 3.7 Hz, H-1 E2), 4.98-5.01 (2H, m, H-1,4 E1), 4.92 (1H, s, H-4 E2), 4.48 (1H, dd, J 6.0, 10.8 Hz, HCHO E1), 4.27 (1H, dd, J 6.2, 11.1 Hz, HCHO E2), 3.87 (1H, t, J 10.8 Hz, HCHO E1), 3.87 (1H, t, J 11.1 Hz, HCHO E2) 2.66-2.71 (1H, m, H-2 E2), 2.03-2.14 (2H, m, H-3 E2 & H-2 E1), 1.48 (1H, dd, J 7.9, 11.5 Hz, H-3 E1), 1.41(1H, dt, J 4.0, 8.0 Hz, H-3 E1), 0.87 (1H, dd, J 4.1, 11.3 Hz, H-3 E2).

Example 9

Preparation of a Polymeric Catalyst

A solution of dichlorobenzylidene-(N,N-bismesitylimidazolinylidene)tricyclohexyl-phosphine-ruthenium (II) (7.4 mg, 0.0087 mmol) in $CH_2Cl_2$ (2 ml) was added via a cannula to a solution of 7-oxa-2-norborn-2-en-5-ylmethyl 2-isopropoxy-3-ethenyl-phenyl ether (25 mg, 0.087 mmol from Example 7) and 7-oxa-2-norborn-2-en-5-yl-methyl benzoate (60 mg, 0.261 mmol from Example 8) in $CH_2Cl_2$ (3 ml) in a 5 ml round-bottomed flask under a nitrogen atmosphere and with vigorous stirring. After 10 min, the $^1H$ NMR analysis of the red reaction solution showed the complete conversion of the reactants, recognizable by the disappearance of the olefinic norbornene signals at 6.2-6.5 ppm. After adding CuCl (1 mg, 0.101 mmol), the resulting solution was heated to reflux for one hour, resulting in a pale green solution.

After cooling, the reaction solution was concentrated under reduced pressure to dryness and the residue was taken up in a 1:1 mixture of hexane and $CH_2Cl_2$. The insoluble copper salts were removed by filtration through a Pasteur pipette filled with cotton wool.

The clear, green solution was concentrated to dryness under reduced pressure and the solid residue was washed successively with hexane (10 ml) and diethyl ether (10 ml). After drying under high vacuum, the polymeric product (74.5 mg, 93% of theory) was obtained as a pale green, adhesive solid. The catalyst loading of the polymeric product can be determined by integration of the $^1H$ NMR signals at 16.67 and 7.99 ppm.

$\delta_H$ (500 MHz, $CDCl_3$): 16.67 (1H, bs, Ru=CH), 7.99 (60H, bs, o-Ar ester), 7.50 (31H, bs), 7.38 (62H, bs), 7.04 (18H, bs), 6.91 (9H bs), 6.74 (9H, bs), 5.7-5.6 (90H, bs) 5.21 (10H, bs), 4.7-3.7 (180H, m), 2.78 (20H, bs), 2.37 (61H, bs), 2.01 (50H, bs) 1.23 (60H, bs);

N.B.: the overlapping and very broad signals cause some integrals of the high-field signals to become closer together, but nevertheless consistent for different polymer charges.

Examples 10-24

General Procedure for Carrying out Metathesis Catalysis using the Polymeric Catalyst from Example 9

The substrate (compounds 14 to 21) (0.12 mmol) $CH_2Cl_2$ (1.6 ml) was added at room temperature to a solution of the polymeric catalyst from Example 9 ($1.2 \times 10^{-3}$ mmol) in $CH_2Cl_2$ (1 ml) under a nitrogen atmosphere. The resulting pale green solution was stirred until the substrate had been quantitatively converted according to the $^1H$ NMR spectrum or thin-layer chromatography. After the reaction, the catalyst can be removed as a green adhesive material from the catalytic reaction mixture by adding cold diethyl ether (7 ml). Alternatively, the addition of cold hexane or a diethyl ether-hexane mixture leads to the precipitation of the catalyst as a green solid. The products (compounds 22 to 29) could subsequently be obtained by filtering and removing the solvent.

The catalysis results are compiled in Tables 1 and 2.

TABLE 1

| | | Activity of the polymeric catalyst from Example 9 in metathesis reactions. | |
|---|---|---|---|
| Example | Substrate | Product/(reaction time) | Conversion (%) |
| 10 | 14 | 22 (45) | >98 |
| 11 | 15 | 23 (360) | >98 |

TABLE 1-continued

Activity of the polymeric catalyst from Example 9 in metathesis reactions.

| Example | Substrate | Product/(reaction time) | Conversion (%) |
|---|---|---|---|
| 12 | 16 | 24 (60) | >98 |
| 13 | 17 | 25 (15) | >98 |
| 14 | 18 | 26 (60) | >98 |
| 15 | 19 | 27 (30) | >98 |
| 16 | 20 | 28 (270) | >98 |
| 17 | 21 | 29 (70) | >98 |

TABLE 2

Recyclability of the polymeric catalyst from Example 9 in the ring-closing metathesis of toluenesulphonyl-N,N-diallylamide

| Example | Cycle | Time (min) | Conversion (%) |
|---|---|---|---|
| 18 | 1 | 60 | >98 |
| 19 | 2 | 60 | >98 |
| 20 | 3 | 60 | >98 |
| 21 | 4 | 60 | >98 |
| 22 | 5 | 60 | >98 |
| 23 | 6 | 120 | >98 |
| 24 | 7 | 240 | >98 |

The invention claimed is:

1. A polymeric transition metal catalyst comprising:
a polymeric compound having a degree of polymerization numerical average value from 6 to 2000 and containing at least one transition metal catalyst comprising:
at least one structural unit of the formula (Ia):

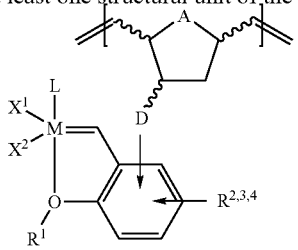

where;

M is a transition metal of the $8^{th}$ transition group of the Periodic Table;

$X^1$ and $X^2$ are the same or different and are each chlorine, bromine or iodine;

L is an N-heterocyclic carbene ligand of the formula (II):

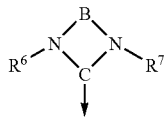

where the direction of the arrow is intended to represent the bond to M and where;

B is a 1,2-ethanediyl or 1,2-ethenediyl radical which is optionally mono- or disubstituted by $C_1$-$C_4$-alkyl, $C_6$-$C_{15}$-arylalkyl or $C_5$-$C_{14}$-aryl; and $R^6$ and $R^7$ are each independently $C_1$-$C_{20}$-alkyl or $C_5$-$C_{24}$-aryl;

$R^1$ is cyclic, straight-chain or branched $C_1$-$C_{20}$-alkyl or $C_5$-$C_{24}$-aryl; and $R^2$, $R^3$ and $R^4$ are each independently hydrogen, $C_1$-$C_{20}$-alkyl, $C_5$-$C_{24}$-aryl, halogen, $C_1$-$C_4$-fluoroalkyl, $C_1$-$C_4$-alkoxy, $C_5$-$C_{14}$-aryloxy, ($C_1$-$C_8$-alkyl)OCO—, ($C_1$-$C_8$-alkyl)$CO_2$—, ($C_5$-$C_{14}$-aryl)OCO— or ($C_5$-$C_{14}$-aryl)$CO_2$—; and/or in each case two radicals in an ortho-arrangement to one another from the group of $R^2$, $R^3$ and $R^4$ are part of a cyclic system which consists of a carbon framework having 5 to 22 carbon atoms, one or more carbon atoms of the cyclic system optionally being replaced by heteroatoms from the group of sulphur, oxygen or nitrogen, and the cyclic system also being optionally mono- or polysubstituted by radicals selected from the group of halogen, $C_1$-$C_4$-fluoroalkyl, ($C_1$-$C_4$-alkyl)OCO—, ($C_1$-$C_8$-alkyl)$CO_2$—, ($C_6$-$C_{10}$-aryl)OCO— or ($C_5$-$C_{14}$-aryl)$CO_2$—; and A is oxygen, sulphur, sulphoxyl, sulphonyl or $CR^8R^9$ where $R^8$ and $R^9$ are each independently hydrogen or $C_1$-$C_4$-alkyl; and D is $C_1$-$C_8$-alkylene, [($C_1$-$C_8$-alkylene)-O—]$_n$ where n=1 to 12, ($C_1$-$C_8$-alkylene)$CO_2$—, ($C_1$-$C_8$-alkylene)-OCO—($C_1$-$C_8$-alkylene), ($C_1$-$C_8$-alkylene)$CO_2$—($C_1$-$C_8$-alkylene), ($C_1$-$C_8$-alkylene)$CONR^{10}$—, ($C_1$-$C_8$-alkylene)$NR^{10}CO$—, ($C_1$-$C_8$-alkylene)$CONR^{10}$—($C_1$-$C_8$-alkylene) or ($C_1$-$C_8$-alkylene)$NR^{10}CO$—($C_1$-$C_8$-alkylene) where $R^{10}$ is hydrogen or $C_1$-$C_4$-alkyl; and at least and structural units of the formula (Ib)

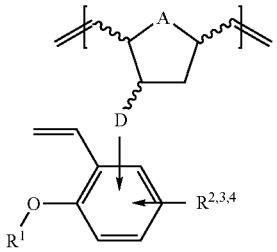

where A, D, $R^1$, $R^2$, $R^3$ and $R^4$ each independently have the same definitions and fulfil the same conditions as specified under the formula (Ia); and optionally, at least one structural units of the formula (Ic):

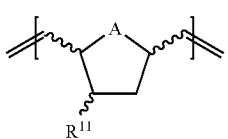

where:

A has the same definition and fulfils the same conditions as specified under the formula (Ia); and $R^{11}$ is $C_1$-$C_8$-alkyl, [($C_1$-$C_8$-alkylene)-O—]$_n$—($C_1$-$C_8$-alkyl) where n=1 to 12, ($C_1$-$C_8$-alkylene)$CO_2$—($C_1$-$C_8$-alkyl), ($C_1$-$C_8$-alkylene)-OCO—($C_1$-$C_8$-alkyl), ($C_1$-$C_8$-alkylene)-OCO—($C_5$-$C_{14}$-aryl), ($C_1$-$C_8$-alkylene)$CO_2$—($C_5$-$C_{14}$-aryl), ($C_1$-$C_8$-alkylene)$CONR^{10}$—($C_1$-$C_8$-alkyl), ($C_1$-$C_8$-alkylene)$NR^{10}CO$—($C_1$-$C_8$-alkyl), ($C_1$-$C_8$-alkylene)$CONR^{10}$—($C_5$-$C_{14}$-aryl) or ($C_1$-$C_8$-alkylene)$NR^{10}CO$—($C_5$-$C_{14}$-aryl) where $R^{10}$ is hydrogen or $C_1$-$C_4$-alkyl.

2. The polymeric compound according to one or more of claims 1 further comprising at least one structural unit derived from olefins suitable for ring-opening metathesis polymerization.

3. The polymeric compound according to claim 1, wherein A, D, M, L, X1 and X2 and R1, R2, R3, R4 and R11 radicals present in the structural units of the formulae (Ia), (Ib) and (Ic) are Identical.

4. The polymeric compound according to claim 1, wherein the average proportion by weight of structural units of the formula (Ia) and (Ib) and (IC) present is 80% or more.

5. The polymeric compound according to claim 1, wherein the ratio of structural units of the formula (Ia) to structural units of the formula (Ib) is 1:2 to 1:500.

6. The polymeric compound according to claim 1, wherein the ratio of structural units of the formula (Ia) to structural units of the formula (Ic) is 10:1 to 1:200.

7. The polymeric compound according to claim 1, wherein D in the structural units of the formulae (Ia) and (Ib) is bonded via the ortho-position to the olefin or the ylidene unit.

8. The polymeric compound according to claim 1, wherein M in formula (Ia) is ruthenium or osmium.

9. The polymeric compound according to claim 1, wherein B in formula (II) is 1,2-ethanediyl or 1,2-ethenediyl.

10. The polymeric compound according to claim 1, wherein $R^6$ and $R^7$ in formula (II) are identical and are primary $C_5$-$C_{20}$-alkyl radicals, wherein the carbon atom bonded to the nitrogen atom bears a tertiary alkyl radical, or secondary $C_3$-$C_{20}$-alkyl radicals, tertiary $C_4$-$C_{20}$-alkyl radicals, or mono- or poly-substituted phenyl radicals wherein substitutions are in ortho-position, by $C_1$-$C_4$-alkyl radicals.

11. A polymeric transition metal catalyst precursor comprising a compound of formula (IV):
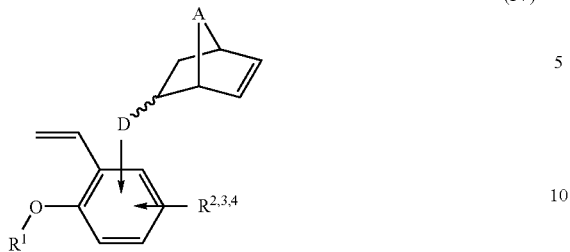
(IV)
where:
R$^1$, R$^2$, R$^3$, R$^4$, A and D are each as defined under formula (Ia) in claim 1.
* * * * *